Dec. 15, 1953  H. NERWIN  2,662,696
FILM CARTRIDGE FOR PHOTOGRAPHIC CAMERAS
Filed March 29, 1951  2 Sheets-Sheet 1

INVENTOR.
HUBERT NERWIN
BY
ATTORNEY

Dec. 15, 1953  H. NERWIN  2,662,696
FILM CARTRIDGE FOR PHOTOGRAPHIC CAMERAS
Filed March 29, 1951  2 Sheets-Sheet 2

INVENTOR.
HUBERT NERWIN
BY
ATTORNEY

Patented Dec. 15, 1953

2,662,696

UNITED STATES PATENT OFFICE 2,662,696

FILM CARTRIDGE FOR PHOTOGRAPHIC CAMERAS

Hubert Nerwin, Irondequoit, N. Y., assignor to Graflex, Inc., Rochester, N. Y., a corporation of Delaware Application March 29, 1951, Serial No. 218,236

4 Claims. (Cl. 242—71)

The present invention relates to a film-holding cartridge for use in photographic cameras.

One object of this invention is to provide a film-holding cartridge carrying a core on which film may be wound and which can be quickly coupled to or disconnected from the driving key or driving mechanism of a camera to permit quick insertion into a camera of a new core as well as quick removal from a camera of a core on which exposed film has been wound.

Another object of this invention is to provide a film-holding cartridge of the nature described into which the lead end of a roll of film can easily and quickly be threaded, even in the dark, and which is, therefore, especially suitable for military use.

A further object of the invention is to provide a film holding cartridge which will be light-tight and which therefore can safely be removed even in daylight as a unit from a camera with an exposed roll of film therein.

Another object of this invention is to provide a film-holding cartridge of the nature described which will be light-tight so that it may serve as a package in which a core of exposed film may safely be shipped to a point where it can be developed.

Another object of the invention is to provide a film-holding cartridge from which a core, on which exposed film has been wound, can readily be removed even in the dark.

Another object of the invention is to provide a film-holding cartridge which consists of a minimum number of readily assemblable or disassemblable parts.

A still further object of the invention is to provide a film-holding cartridge comprising simply a care, a body, and two caps for closing opposite ends of the body and rotatably supporting the core within the body.

Another object of the invention is to provide a film-holding cartridge of the type described in which the two end caps are constructed alike so that they are interchangeable.

Another object of the invention is to provide a film-holding cartridge which is easy to make and which can be manufactured on a production basis at a relatively low cost.

Other objects of the invention will be apparent hereinafter from the specification and from the recital of the appended claims.

Figure 1:
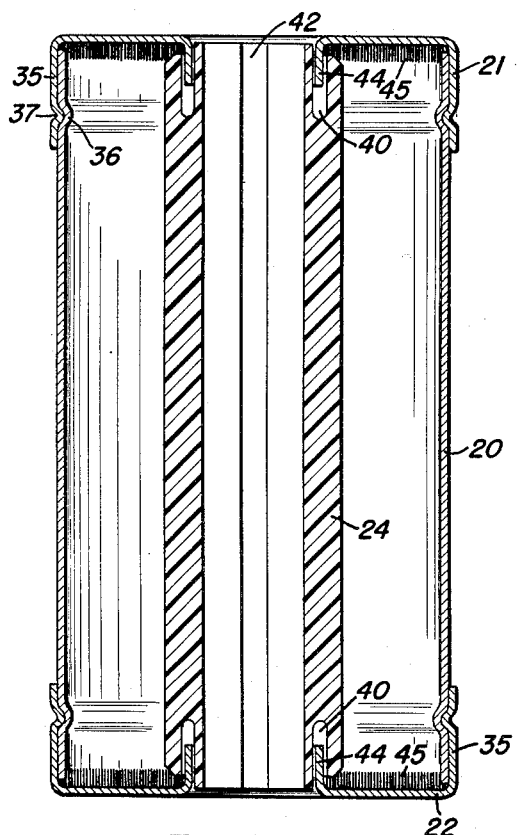
Fig. 1 is an axial section, taken on the line 1—1 of Fig. 2, of an assembled film-holding cartridge made according to one embodiment of this invention.
Figure 2:
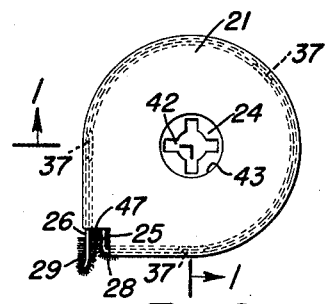
Fig. 2 is an end view of this cartridge on a somewhat reduced scale.

Referring now to the drawings by numerals of reference 20 denotes the body portion of my cartridge; 21 and 22 are the end caps for the cartridge; and 24 is the film core.

The body portion 20 and the caps 21 and 22 of the cartridge are preferably made of a suitable metal such as aluminum. The core 24 is preferably made of a thermoplastic material.

The caps 21 and 22 are preferably made identical with one another so that they may be interchangeable.

Figure 3:
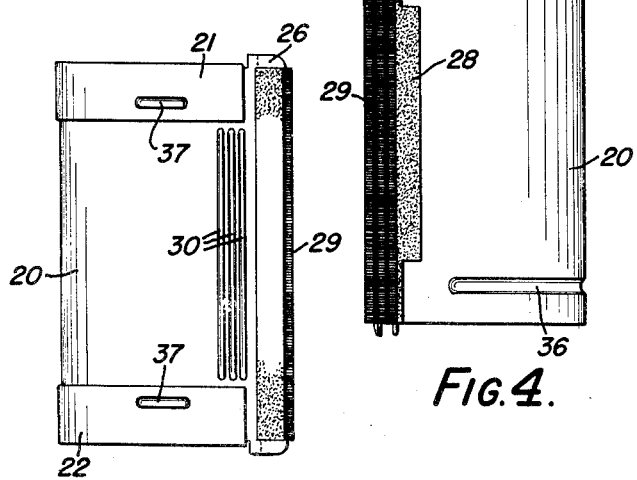
Fig. 3 is a side elevation of this cartridge also on a reduced scale.
Figure 4:
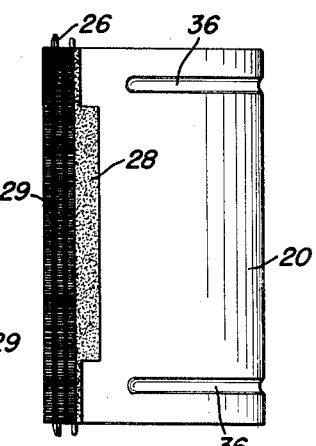
Fig. 4 is a side elevation of the body portion of this cartridge looking at the cartridge from the diametrically opposite point from the view of Fig. 3.
Figure 12:
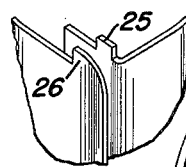
Fig. 12 is a fragmentary perspective view showing a detail of the construction of the body portion of the cartridge.

The body portion 20 of the cartridge is made of a thin sheet and is flexible. It has an axially-extending mouth or opening for passage of film into or out of the cartridge; and this mouth or opening is defined and bounded by an inturned portion 25 (Fig. 7) of the body 20 and a portion 26 of the body, which is generally parallel to portion 25 and which is flared somewhat outwardly at its extreme end so as to permit ready introduction of the film into the mouth of the cartridge. The lips or bounding portions 25 and 26 of the body portion are somewhat longer than the rest of the body portion as shown clearly in Figs. 3, 4 and 12 and are adapted to extend axially beyond the end caps 21 and 22 when the end caps are secured on the body portion. Strips of plush 28 and 29 are glued around the lips 25 and 26 of the body portion to make it light-tight. Corrugations 30 are formed in the body portion 20 adjacent the lip 26 for strength.

Near its opposite ends the body portion 20 is crimped as denoted at 36 (Fig. 4) to provide parallel arcuate recesses or grooves 36 which extend around the major portion of the body. The skirt portion 35 of each of the cap members 21 and 22 is formed by crimping with three equiangularly spaced teats 37 which are adapted to be engaged in the recesses 36 to hold the caps on the body portion 20.

Both caps 21 and 22 are lined with plush 45 for light-tightness. Each cap is generally pear-shaped in cross section, and has its skirt 35 and end cut away as denoted at 47 to provide room for the portions 25 and 26 of the body portion to project beyond the cap. These projections serve to prevent relative angular displacement of the caps on the body portion when assembled thereon. The caps 21 and 22, as well as the body portion 20, are made of metal of thin section so that they are resilient. When the caps are pushed over the ends of the body portion, the skirts 35 of the caps compress the body portion to fit within the caps and confine the body portion; and the teats 37 on the caps snap into the grooves 36 of the body portion to securely hold the caps on the body portion.

The core 24 has circular recesses 40 formed in its opposite ends. It has a bore 42 extending clear through it from one end to the other which is cross-shaped in transverse section. Each cap 21 and 22 has a central opening extending through it bounded by a circular flange 44 (Fig. 1). Each flange 44 is engageable in one of the end recesses 40 of the core 24; and the two flanges 44 serve as bearings and as light traps for the core. Because of the central openings in the caps 21 and 22 and because of bore 42, the bore of the core is accessible from either end of the core, and can be engaged at either end with the driving key of the camera in which the cartridge is being used.

Figure 5:
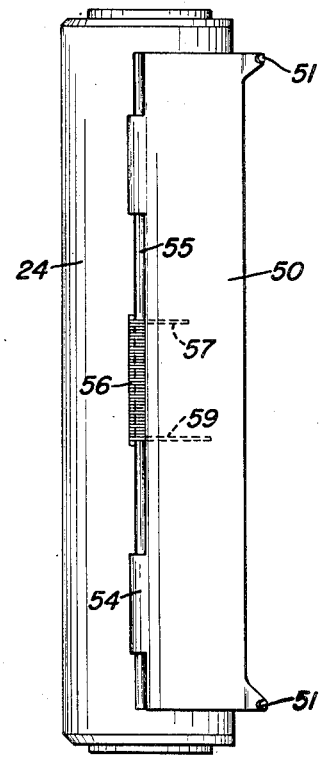
Fig. 5 is a side elevation on the scale of Fig. 1 of the core of the cartridge.
Figure 6:
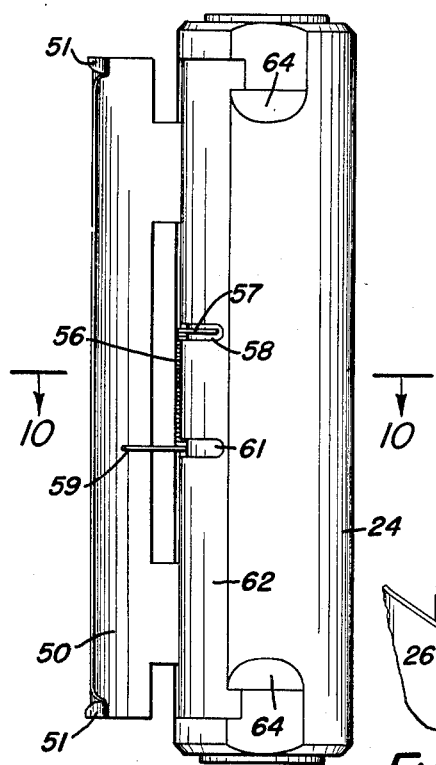
Fig. 6 is a side elevation of this core looking at the core from the diametrically opposite point from the view of Fig. 5, and showing the hook portion of the core open.
Figure 11:
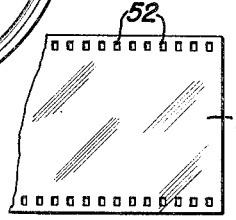
Fig. 11 is a fragmentary view showing the type of film adapted to be used with the film-cartridge of the present invention.
Figure 10:
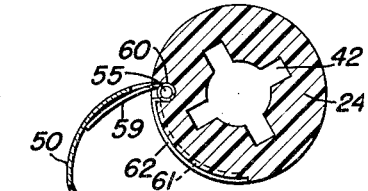
Fig. 10 is a section through the core taken on the line 10—10 of Fig. 6 looking in the direction of the arrows.

Hingedly mounted on the periphery of the core 24 is a thin sectioned plate 50 (Figs. 5 and 6) which is formed at its opposite ends with hooks 51. The two hooks 51 are spaced apart a distance equal to the distance between the two rows of perforations 52 in the film F (Fig. 11) which is to be used in the camera for which the film-cartridge is adapted.

The hooked plate 50 is hingedly mounted on the core 24 by means of a pin 55 (Figs. 5 and 8); and this hooked member 50 is constantly urged outwardly away from the periphery of the core by a coil spring 56, which surrounds hinge-pin 55 and which engages at one end 57 in a recess 58 (Fig. 6) in the core and which abuts at its opposite end 59 against the hooked member 50. The hinge pin 55 is secured in the core by heating the core and pressing the core so that the axial groove 60 (Fig. 8) will engage about and hold the pin.

The core is formed with a peripheral groove 61 to receive the end 59 of the spring 56 and with an axially-extending peripheral recess 62 shaped to receive the hooked member 50 when the hooked member is pressed against the core by film wound on the core. The periphery of the core may be slabbed off adjacent both ends as denoted at 64 (Fig. 6) to receive and clear the hooked portions 51 of the member 50.

In use, it is easy to quickly assemble the cartridge. The core 24 can be seated on the bearing portion 44 of one of the caps; the body portion 20 of the cartridge can then be shoved into this cap; and the other cap can be shoved onto the body portion 20 of the cartridge.

Figure 7:
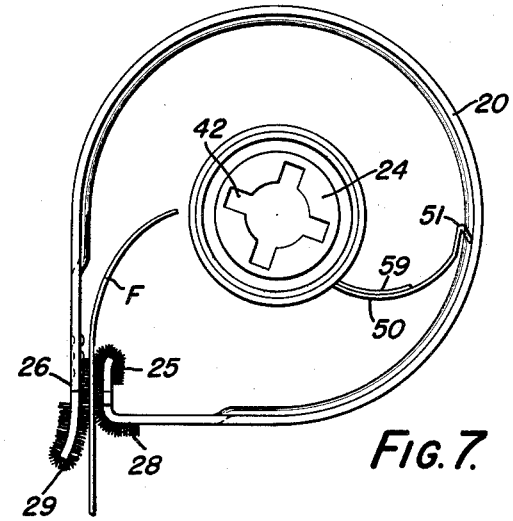
Fig. 7 is an end view of the cartridge with one of the caps removed and showing the normal position of the hook portion of the film core and showing the lead end of a roll of film being threaded into the cartridge.
Figure 8:
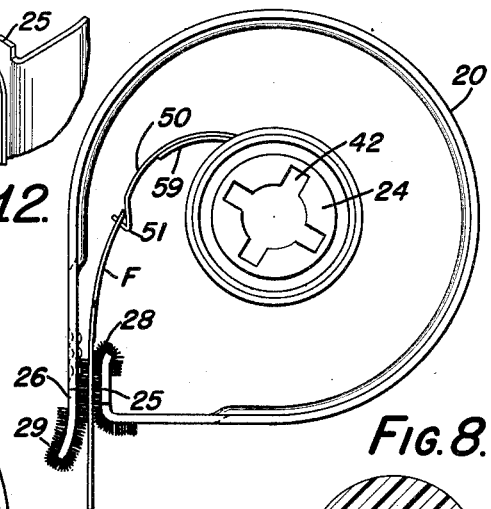
Fig. 8 is a corresponding view showing how the hook portion of the core, upon rotation of the core, engages the film.
Figure 9:
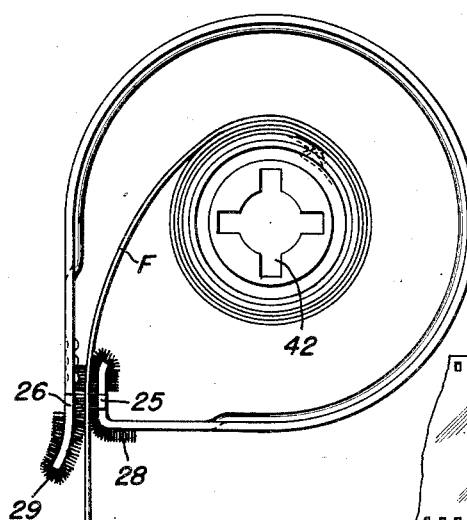
Fig. 9 is a corresponding view showing how, upon further rotation of the core, the film is wound upon the core.

When the core in the cartridge is to be used as the take-up core in a camera, the cartridge is positioned in the camera and the driving key or other driving mechanism of the camera is engaged in one end of the bore of the core carried by the cartridge. Then the lead end of film F from the supply core of the camera is inserted through the mouth of the body portion 20 of the cartridge 20, as shown in Fig. 7, and the core 24 is rotated clockwise, as viewed in Fig. 7, by the key or other driving mechanism of the camera, so as to bring the hooks 51 into engagement with the perforations 52 in the film, as shown in Fig. 8. After a sufficient amount of film has been wound on the take-up core to bring an unexposed portion of the film into picture-taking position, a picture can be taken. Then after successive portions of the film are exposed, the film may be wound in the camera by rotating the core 24. The film winding on the core wraps over and around the hook member 50 and presses the hook member into the recess 62 in the periphery of the core, as shown in Fig. 9.

After all of the film has been exposed, the whole cartridge can be removed from the camera, and a new cartridge positioned therein, or the cartridge which has previously been used as the supply cartridge can be shifted to the take-up position in the camera and a new cartridge loaded with film can be introduced into the camera. The cartridge with the exposed film therein is light-tight and provides a ready case for keeping or shipping the film until it can be developed. To remove the core with the exposed film thereon from the cartridge all that is necessary to do is to remove one of the caps 21 or 22 and lift the core out. This can be done readily in the dark. A new core with unexposed film there on can just as readily be placed in the cartridge case in the dark and the cap 21 or 22, which has been removed, can then readily be replaced.

The cartridge or cassette of the present invention has definite advantages for military purposes because it permits daylight loading and unloading of a camera in the field due to the light-tight protection of the film. Hence it is not necessary to provide the film with a long leader or a long trailer. This reduces winding time both before and after exposure to a minimum; the camera is ready for picture taking almost by loading it with a cartridge. Moreover, the film core is designed so that it can be engaged on either end with the driving key of the camera for rotation in either direction. The cartridge, however, has to be inserted in the camera in the proper direction to have the film seat properly in the exposure opening. Furthermore, when a roll of exposed film has been wound on the core in the cartridge, the film is securely protected and can safely be sent to a developing point. All these advantages have application also in civilian uses.

While the invention has been described in connection with a specific embodiment thereof, it will be understood that it is capable of further modification, and this application is intended to cover any variations, uses, or adaptations of the invention, following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention what I claim is:

1. A roll film cartridge for photographic cameras comprising a housing having an axially-extending slot therein through which film may be introduced into or fed out of said housing, said housing being closed except for said slot, a core rotatably supported in said housing, and a member projecting from the periphery of said core, said member having a hook portion on its projecting end and being resiliently urged into proximity with the inside wall of said housing so that said member is in position to engage a perforation in the lead end of a strip of film after said lead end has been introduced through said slot into said housing and said core has been rotated to bring said projecting member into engagement with said perforation.

2. A roll film cartridge for photographic cameras comprising a flexible casing which has an axially-extending slot therein forming a mouth through which film may be introduced into or fed out of said casing, a pair of end caps removably positioned over the ends of said casing to compress said casing and to close the opposite ends of said casing, a rotatable core having a bore extending axially therethrough, and a member projecting beyond the periphery of said core and constantly urged resiliently into proximity with the inside wall of the compressed casing to engage a perforation in the lead end of a roll of film to drivingly engage said lead end when said lead end is introduced into said casing and said projecting member has been rotated into engagement with said perforation, each of said end caps having a central opening therethrough aligned with the bore of said core and through which a driving member of the camera may be introduced into said bore, said core having an annular recess in each end, and each of said end caps having an annular flange surrounding its central opening which engages in the annular recess in the adjacent end of said core and constitutes a bearing and light trap for said core.

3. A roll film cartridge for photographic cameras comprising a flexible casing which has an axially-extending slot therein and which has two lip portions bounding said slot to form a mouth through which film may be introduced into or fed out of casing, said lip portions being covered with a compressible material providing a normally light-tight closure for said mouth, a pair of end caps removably mounted on said casing to compress said casing and to close opposite ends of said casing, a core having a bore extending axially therethrough, a member hingedly mounted on said core and having a pair of hooks on its free end which are axially spaced to engage perforations adjacent opposite marginal edges of perforated film, and spring means constantly urging the free end of said hinged member away from the periphery of said core into proximity with the inside wall of the compressed casing, said core having a peripheral recess therein to receive said hinged member when depressed, each of said end caps having a central opening aligned with said bore through which a driving member of a camera may be introduced into said bore, said core having an annular recess in each end, and each of said end caps having an annular flange around its central opening which engages in the annular recess in the adjacent end of said core and which serves as a bearing and light trap for said core.

4. A roll film cartridge for photographic cameras comprising a housing having an axially-extending slot therein through which film may be introduced into or fed out of said housing, said housing being closed except for said slot, a core rotatably supported in said housing, a member hingedly mounted at one end on said core and having a pair of hooks on its free end which are axially spaced to engage axially spaced perforations of perforated film, and spring means interposed between said hooked member and said core and constantly urging said member about its hinge axis away from the periphery of said core, the inside wall of said housing being spaced from the periphery of said core a distance less than the maximum radial distance between the free end of said hooked member and the periphery of said core whereby said member is held in position so that its hook may engage with a perforation in the lead end of a roll of film after said lead end has been introduced into said housing and said core is rotated.

HUBERT NERWIN.

References Cited in the file of this patent

UNITED STATES PATENTS

| Number | Name | Date |
|---|---|---|
| 664,604 | Bennett | Dec. 25, 1900 |
| 1,522,248 | Johnson | Jan. 6, 1925 |
| 1,799,748 | Hayden | Apr. 7, 1931 |
| 1,966,347 | Hughey | July 10, 1934 |
| 2,017,160 | Parker | Oct. 15, 1935 |
| 2,119,943 | Marks | June 7, 1938 |
| 2,153,573 | Kinloch | Apr. 11, 1939 |
| 2,481,665 | Henne | Sept. 13, 1949 |
| 2,487,479 | Roehrl | Nov. 8, 1949 |